United States Patent
Zou et al.

(10) Patent No.: US 9,689,968 B2
(45) Date of Patent: Jun. 27, 2017

(54) WHOLLY OPTICALLY CONTROLLED PHASED ARRAY RADAR TRANSMITTER

(71) Applicant: Shanghai Jiao Tong University, Shanghai (CN)

(72) Inventors: Weiwen Zou, Shanghai (CN); Chenjun Liu, Shanghai (CN); Anliang Yu, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 275 days.

(21) Appl. No.: 14/595,149

(22) Filed: Jan. 12, 2015

(65) Prior Publication Data
US 2016/0054431 A1 Feb. 25, 2016

Related U.S. Application Data

(63) Continuation of application No. PCT/CN2014/000318, filed on Mar. 24, 2014.

(30) Foreign Application Priority Data

Feb. 26, 2014 (CN) .......................... 2014 1 0065532

(51) Int. Cl.
*H01Q 3/00* (2006.01)
*H01Q 3/12* (2006.01)
(Continued)

(52) U.S. Cl.
CPC ........... *G01S 7/282* (2013.01); *H01Q 3/2676* (2013.01); *G01S 2013/0245* (2013.01)

(58) Field of Classification Search
CPC .............................. G01S 7/282; H01Q 3/2676
(Continued)

(56) References Cited

U.S. PATENT DOCUMENTS

| 5,307,073 A | 4/1994 | Riza |
| 6,426,721 B1 | 7/2002 | Obara |

FOREIGN PATENT DOCUMENTS

| CN | 1815338 A | 8/2006 |
| CN | 103346469 A | 10/2013 |

OTHER PUBLICATIONS

Garenaux, K. et al., Recent Breakthroughs in RF Photonics for Radar Systems. Aerospace and Electronic Systems Magazine, IEEE, vol. 22, pp. 3-8 (2007).

Primary Examiner — Dao Phan
(74) Attorney, Agent, or Firm — Mei & Mark LLP; Manni Li

(57) ABSTRACT

A wholly optically controlled phased array transmitter with integrated tunable optoelectronic oscillators, which are based on multi-wavelength optical sources and optical true time delay units, and optical time delay networks, having a multi-wavelength optical source, a first wavelength division multiplexer, a first optical splitter, a first electro-optic modulator, a second optical splitter, a first optical amplifier, a first optical time delay network, a photodetector, an electric amplifier, a DC-block, a second electro-optic modulator, a second optical amplifier, a second optical time delay network, an optical combiner, a second wavelength division multiplexer, an optical fibers, a photodetector array, a T/R component array, a microwave antenna array, a 1×2 optical switch, a 2×2 optical switch, a circulator, a third wavelength division multiplexer, a bundle of optical fibers with precise lengths, and a Faraday rotation mirror.

10 Claims, 2 Drawing Sheets

(51) Int. Cl.
  *H01Q 3/22*  (2006.01)
  *G01S 7/282*  (2006.01)
  *H01Q 3/26*  (2006.01)
  *G01S 13/02*  (2006.01)
(58) Field of Classification Search
  USPC ........ 342/368, 372, 374, 375; 359/238, 245, 359/279
  See application file for complete search history.

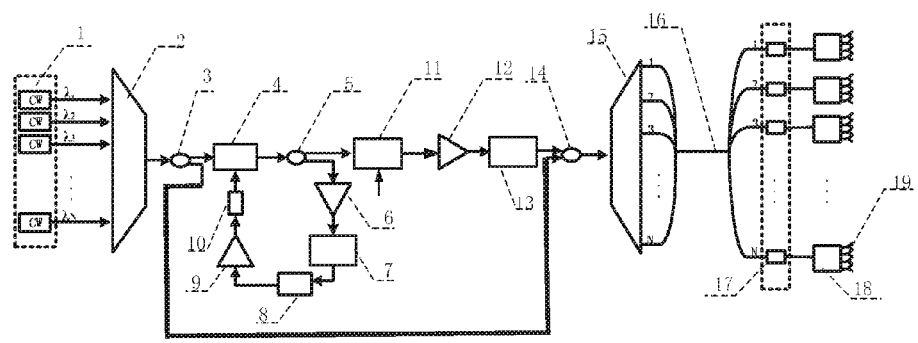
Fig. 1
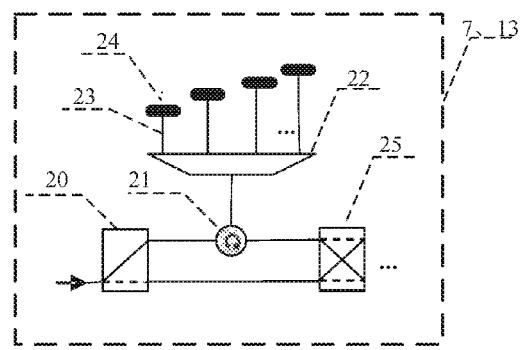
Fig. 2
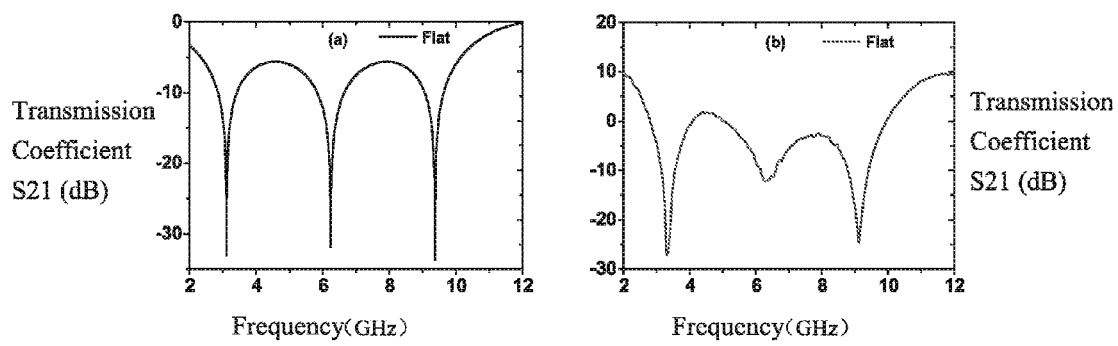
3(a)     Fig. 3     3(b)

5(a)          5(b)

WHOLLY OPTICALLY CONTROLLED PHASED ARRAY RADAR TRANSMITTER

CROSS-REFERENCE TO RELATED APPLICATIONS

The subject application is a continuation of PCT international application PCT/CN2014/000318 filed on Mar. 24, 2014, which in turn claims priority on Chinese patent applications CN 201410065532.3 filed on Feb. 26, 2014. The contents and subject matter of the PCT and Chinese priority applications are incorporated herein by reference.

FIELD OF THE INVENTION

The present invention relates to methods and devices in the fields of microwave photonics and radar, particularly, a wholly optically controlled phased array radar transmitter with integrated optical time delay networks and optoelectronic oscillators based on multi-wavelength optical sources and optical time delay networks.

BACKGROUND ART

Phased array antenna system have extensive applications in the fields of radar, communications and electronic countermeasure systems, and the indispensable components include high-quality broad-band tunable microwave signal sources, broad-band radar baseband signal sources, and phase delay beam-forming network. With traditional electronic controlled phased array antennas, the radar baseband signal goes through amplification, power balance, and other processing after it is modulated into microwave signals. Then, it is phase-shifted via the placement of microwave phase shifters on the arrays or units. After changing the phase relationships among antenna units, it finally forms into a spatial microwave beam signal. However, on one hand, the traditional electronic controlled phased array radar suffers the "aperture effect" of the phased array radar, which limits its application in the fields of radar working bandwidth, high resolution measurement, radar imaging, and spread spectrum code. On the other hand, restrictions exist for the traditional phased array radar (including optically controlled ones), such as the limited range of tunable microwave signals, limited product of time and bandwidth of radar signals, and strong phase noise. At certain deviated frequency, bad phase noise characteristics result in that the returned signal is concealed in the phase noise of the carrier wave, and thus, the target may not be properly detected.

With the development of the microwave photonics technology and extensive applications in the radar field, restriction on aperture transit time in the traditional phased array antenna is effectively overcome by the application of the true-time delay line technology. Optically controlled wave beam forming network based on the true-time delay may be used for scanning antenna wave beams with the benefits of broader instantaneous bandwidth, no wave beam squinting effect, low loss, small dimension, anti-electromagnetic interference, and long detection distance. It has become an important direction for the development of the phased array radar. In the mean time, optoelectronic oscillators are advantageous in generating microwave signals with low phase noise and broad range of tunable frequency, and they have great potential in the applications in optical signal processing, radar, communications, and bio-imaging detection.

Optically controlled phased array radar in the current research mostly adopts the architectures similar to those in K. Garenaux et al., "Recent breakthroughs in RF photonics for radar systems," Aerospace and Electronic Systems Magazine, IEEE, vol. 22, pp. 3-8, 2007. The transmission link works as follows: corresponding carrier signals and modulated signals generated by the microwave signal generator are electro-optically transformed via a modulator, pass through a delay network structure, are transformed from optical signals to electric signals via an optoelectronic detector, and then are transmitted via microwave T/R components and antennas. The receiving circuit, on the other hand, receives reflected signals via microwave antennas and T/R components, conducts frequency mixing, conducts phase compensation by reusing the delay network of the transmission line, and finally processes the signals.

For the series delay systems of the optically controlled phased array radar in the current technology, the delay scheme based on multi-wavelengths has broad delay range, no power cycle fading resulting from dispersion, and thus, its front end needs the laser arrays or multi-wavelength lasers. The laser arrays or multi-wavelength lasers may combine with the delay network to form a microwave photonic filter. It may be a finite response microwave photonic filter with relatively high Q factor when the number of the laser arrays or the wavelength number is large. By employing the microwave photonic filter in a close-loop, an optoelectronic oscillator with tunable bandwidth is made.

SUMMARY OF THE INVENTION

The present invention provides a wholly optically controlled phased array radar transmitter based on optical delay units with integrated tunable optoelectronic oscillators and optically controlled wave beam forming networks.

The wholly optically controlled phased array transmitter of the present invention, with integrated tunable optoelectronic oscillators, which are based on multi-wavelength optical sources and optical true time delay units, and optical time delay networks, comprises a multi-wavelength optical source, a first wavelength division multiplexer, a first optical splitter, a first electro-optic modulator, a second optical splitter, a first optical amplifier, a first optical time delay network, a photodetector, an electric amplifier, a DC-block, a second electro-optic modulator, a second optical amplifier, a second optical time delay network, an optical combiner, a second wavelength division multiplexer, an optical fiber, a photodetector array, a T/R component array, a microwave antenna array, a 1×2 optical switch, a 2×2 optical switch, a circulator, a third wavelength division multiplexer, a bundle of optical fibers with precise lengths, and a Faraday rotation mirror. The components are arranged successively along the direction of the laser output of the multi-wavelength optical source in the following order: the first wavelength division multiplexer, the first optical splitter, the first electro-optic modulator, the second optical splitter, the second electro-optic modulator, the second optical amplifier, the second optical time delay network, the optical combiner, the second wavelength division multiplexer, the optical fiber, the photodetector array, the T/R component array, and the microwave antenna array.

The second output port of the second optical splitter is connected with a radio frequency (RF) input port of the first electro-optic modulator via the following components in an order of the first optical amplifier, the first optical time delay network, the photodetector, the electric amplifier, and the DC-block; they form a close loop as an optoelectronic oscillator to generate a microwave signal. The second output port of the first optical splitter is connected with the second input port of the optical combiner. The second input port of the second electro-optic modulator is a microwave input port.

The first optical time delay network or the second optical time delay network is connected in the following manner: a light transmitted from the first optical amplifier or the second optical amplifier is inputted via the 1×2 optical switch, and after gating, enters the third wavelength division multiplexer en route of the circulator; the third wavelength division multiplexer then demultiplexes the signal of the light and redistributes the light to various wavelengths; the light then passes through the precisely-cut fibers of various lengths, it is finally reflected back by the Faraday rotation mirror, and then passes again through the fibers, the third wavelength division multiplexer, and the circulator to arrive at the next optical switch.

The first optical splitter splits a laser light transmitted by the multi-wavelength optical source into two parts: the first part is utilized as an optical carrier for an optoelectronic oscillator, and the second part is utilized as an optical carrier for coherent demodulation. The optical input port of the first electro-optic modulator is connected with the first output port of the first optical splitter, receives a portion of the signal of the optical carrier, and modulates the signal of the optical carrier. The second optical splitter splits the modulated signal of the optical carrier into two. The first optical amplifier amplifies a portion of the signal of the light from the second output port of the second optical splitter. The first optical time delay network is connected to the output port of the first optical amplifier. The photodetector transforms an optical signal from the first optical time delay network into an electric signal. The electric amplifier amplifies the transformed electric signal and feeds it back again to the RF input port of the first electro-optic modulator, it thus forms an optoelectronic oscillator which generates a tunable microwave signal as a microwave input signal for the first electro-optic modulator. In order to purge the DC remnants, a microwave DC-block is inserted after the electric amplifier. The optical input port of the second electro-optic modulator is connected to the first output port of the second optical splitter. It takes an optical sideband and an optical carrier generated by the optoelectronic oscillator together as an optical carrier for the second electro-optic modulator, and the microwave input port of the second electro-optic modulator is to connected to an electric signal related to radar signals (such as linear sweep pulse signals, phase-coded signals and so on). The second optical amplifier amplifies the optical signal loaded with the microwave carrier and radar signals. The second optical time delay network is connected to the output port of the second optical amplifier for delaying the light of various wavelengths to generate phase differences. The optical combiner combines the optical signal passing through the second optical delay network with the second part of carrier split by the first optical splitter. The second wavelength division multiplexer demultiplexes the optical signal passing through the optical combiner. The photodetector demodulates an electric signal from each channel. The T/R component amplifies the electric signal, and the antenna radiates out the microwave signal.

The multi-wavelength optical source is a laser array or a multi-wavelength laser, which may be a semi-conductor laser, an optical fiber laser, a gas laser, or a dye laser.

The wavelength division multiplexer is a dense wavelength division multiplexer, or an array waveguide grating multi/demultiplexers.

The optical splitter is an optical power splitter or an optical coupler for splitting or combining optical signals.

The electro-optic modulator is an optical intensity modulator or an optical phase modulator.

The optical intensity modulator is a single sideband modulator or an electro-absorption modulator.

The optical amplifier is an erbium-doped fiber amplifier, a semiconductor optical amplifier, or a Raman amplifier for amplifying optical signals and effectively reducing insertion loss of a microwave photonic link.

The optically controlled beam-forming time delay network is a multi-wavelength based time delay network, and may be a multi-wavelength based optical true time delay network, a dispersive time delay network or a space time delay network based on dispersive devices, or a time delay network based on waveguide structures.

The photodetector transforms optical signals to electric signals, and may be a PIN diode or an APD.

The electric amplifier may be a power amplifier or a low noise amplifier.

The T/R component is a transmitting and receiving unit for low noise pre-amplification of radar transmission and reception signals.

The microwave antenna transmits and receives signals, and may be a half-wave dipole antenna.

The present invention has the following advantages and characteristics:

1. The present invention is an optically controlled phased array radar system based on multi-wavelengths, which makes use of time delay networks with the same structures simultaneously as a radar microwave generating optoelectronic oscillator and an optically controlled wave-beam forming structure. It thus saves an external microwave source for generating microwave carriers, and is advantageous with a compact structure and reduced system cost.

2. In the present invention, microwave carrier signals of various microwave frequencies (such as the L frequency, S frequency, X frequency, Ku frequency, K frequency, or the Ka frequency) may be generated by regulating the delay time of the first time delay network or the wavelength of the multi-wavelength laser. By switching the first time delay network or by changing the wavelength of the multi-wavelength laser, frequency hopping within the same frequency band may be realized.

3. In the present invention, the multi-wavelength laser is respectively employed in the optoelectronic oscillator with a tunable broadband for generating broadband-tunable and frequency-adjustable radar microwave signals, in generating radar baseband signals, in the optically controlled wave-beam forming network for radar signals, and in the optical carrier of coherent demodulation. The usage of lasers achieves high efficiency and reduces cost.

BRIEF DESCRIPTION OF THE DRAWINGS

FIG. 1 is a schematic diagram of the wholly optically controlled phased array radar transmitter of the present invention.

FIG. 2 is a schematic diagram of the optical time delay network based on the multi-wavelength of the present invention.

FIG. 3($a$) shows simulation data, and FIG. 3($b$) shows experiment data in the responses of the optoelectronic oscillating unit of the wholly optically controlled phased array radar transmitter of the present invention with four channel wavelengths and an open loop. Time delay difference between the channels is 80 ps, and the multi-wavelength lasers have the same power.

DETAILED DESCRIPTION OF THE INVENTION

Figure 4:
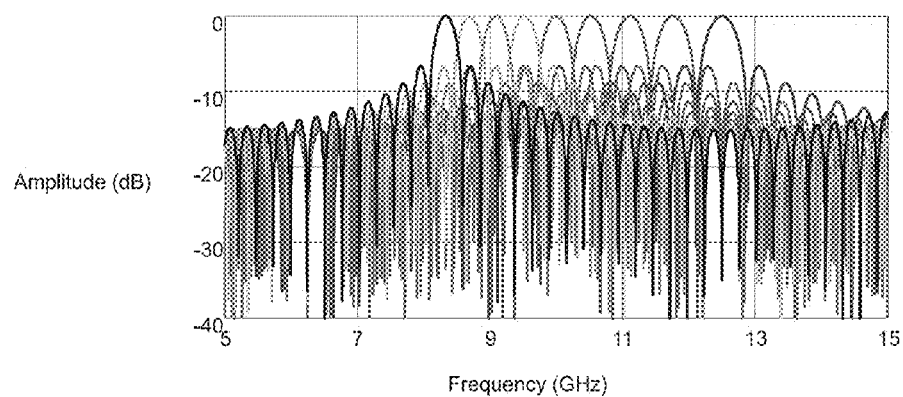
FIG. 4 is an effect diagram of the optoelectronic oscillating unit of the wholly optically controlled phased array radar transmitter of the present invention working under four channel wavelengths and an open loop. Time delay increases from 80 to 120 ps with a step of 5 ps, simulating responses of microwave photonic filters.
Figure 5:
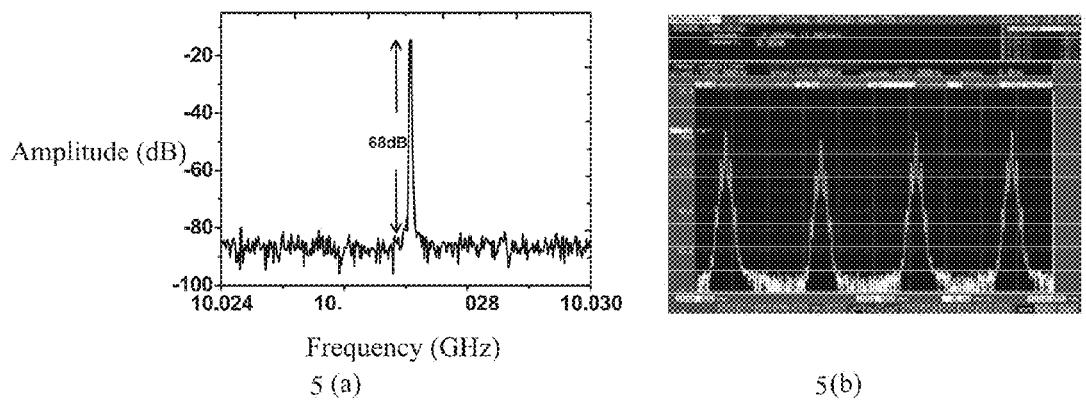
FIG. 5(a) shows the microwave signals generated by the optoelectronic oscillating unit of the wholly optically controlled phased array radar transmitter of the present invention.
FIG. 5(b) shows the experiment data of the spectrogram thereof passing through the electro-optic modulator.

In combination with the drawings and an embodiment hereunder provided, the present invention will be further expounded. The embodiment provides detailed implementation means and procedures based on the technical solution of the present invention, and is not meant to limit the scope of the present invention.

As shown in FIG. 1, the wholly optically controlled phased array radar transmitter of the present invention comprises a multi-wavelength optical source 1, a first wavelength division multiplexer 2, a first optical splitter 3, a first electro-optic modulator 4, a second optical splitter 5, a first optical amplifier 6, a first optical time delay network 7, a photodetector 8, an electric amplifier 9, a DC-block 10, a second electro-optic modulator 11, a second optical amplifier 12, a second optical time delay network 13, an optical combiner 14, a second wavelength division multiplexer 15, an optical fiber 16, a photodetector array 17, a T/R component array 18, a microwave antenna array 19, a 1×2 optical switch 20, a 2×2 optical switch 25, a circulator 21, a third wavelength division multiplexer 22, a bundle of optical fibers with precise lengths 23, and a Faraday rotation mirror 24.

The fore-going components are connected in the following manner: optical signals of different wavelengths generated by the multi-wavelength optical source 1 are combined by the first waveguide array grating 2; the first output port of the first optical splitter 3 is connected with the optical input port of the first electro-optic modulator 4, and a part is split out of the combined optical signals and is inputted to the optical input port of the first electro-optic modulator 4, the optical output port thereof is connected to an input port of the first optical amplifier 6 via a second output port of the second optical splitter 5, the first optical amplifier of the embodiment is an erbium doped fiber amplifier. A part of light outputted from the second optical splitter 5 is amplified so as to reduce insertion loss of the link; the first optical time delay network 7 has its input port connected with the output port of the first optical amplifier 6 and carries out respective time delay on each channel; the part of light then enters the photodetector 8 and is transformed from an optical signal to an electric signal; the low noise electric amplifier 9 amplifies the transformed electric signal so as to increase the gain from the laser to the photodetector, the electric signal then passes through the DC-block 10 to filter out the baseband signal, and is fed back to the RF input port of the first electro-optic modulator 4. At the same time, the other part of light split by the first output port of the second optical splitter 5 passes through the second electro-optic modulator 11, and is modulated with a modulated radar signal such as a linear chirp pulse signal or a phase coded signal inputted in the microwave input port of the second electro-optic modulator 11. It similarly passes through the second optical amplifier, which is an erbium-doped fiber amplifier. After being amplified thereby, and it enters another set of the second optical time delay network 13 which carries out respective time delay on each channel delayed. The optical combiner 14 combines the signal phase-shifted by the time delay network with the second part of optical signal split by the first optical splitter 3, and the second waveguide array grating 15 demultiplexes the signals combined by the optical combiner 14. The optical fiber 16 transmits the optical signal to the antenna transmitting base, and the photodetector array 17 restores the optical signal from each channel to an electric signal. The T/R component 18 pre-amplifies the electric signal from the photodetector and the microwave antenna array 19 finally radiates out the microwave signal.

In the present invention, the time delay network is connected in the following manner: a light passing through EDFA1 and EDFA2 is inputted via the 1×2 optical switch (20), and after gating, enters the waveguide array grating (22) en route of the circulator (21). The waveguide array grating then demultiplexes a signal of the light, and redistributes the light to various wavelengths. The light then passes through a bundle of optical fibers (23) with various precise lengths and is finally reflected back by the Faraday rotation mirror (24). It then passes again through the a bundle of optical fibers (23) with various precise lengths (23), the waveguide array grating (22), and the circulator (21) to arrive at the next optical switch (25).

The working principle of the present invention is as follows: first, a laser beam of various wavelengths generated by the multi-wavelength optical source and multiplexed via the AWG is inputted as an optical carrier signal in the electro-optic modulator. The electro-optic modulator outputs the signal in two parts, one part as optically generated microwave to form an optoelectronic oscillator for producing the needed microwave carrier signals. The other part generates different delay times to form a wave-beam forming network.

For an optoelectronic oscillator, a laser of a different wavelength provides a different tap, while the time delay network provides a relative delay to form a microwave photonic filter with effective response. As the number of laser wavelengths reaches a certain quantity, albeit it is periodically responsive, the 3 dB of the passband thereof may become narrow enough to form a single response microwave photonic filter by introducing low-pass response via employment of a photodetector with a certain bandwidth; thus, it is a substitute of mode selection for a microwave filter in a traditional optoelectronic oscillator to form a close loop in response from the microwave photonic filter, and therefore, becomes an optoelectronic oscillator for producing the required microwave signals. For the optoelectronic oscillator to start, an optical amplifier and a low noise amplifier are respectively inserted to amplify optical and electric signals, so as to reduce insertion loss in the open loop link from the laser to the photodetector. Meanwhile, modulation in accordance with relative delay of the time delay network will generate a tunable microwave signal.

The tunable microwave signal generated by the foregoing optoelectronic oscillator is modulated via an RF input port of the first electro-optic modulator 4 to an optical carrier signal, the generated optical carrier together with a sideband signal passes through the second electro-optic modulator 11 and is modulated onto a radar signal, it is amplified by the second optical amplifier 12 and sent to the second optical time delay network 13, and then, it is demultiplexed via the second waveguide array grating 15. Thus, in each wavelength there are four optical signals including an optical carrier, a radar-signal-modulated optical carrier, and two side bands (the difference in side frequency being that of the microwave carrier). These four signals are sent to the photodetector array 17 at the back end for demodulation, the radar signal carried on the microwave carrier is detected by means of interference detection, and it passes through the T/R component 18 and is transmitted out at last by the antenna array 19, completing the spatial wave beamforming. The above system generates microwave signals by means of time delay networks with similar structures, thus it saves external microwave sources, and therefore results in compactness and simplicity of the structure of the optically controlled phased array, as well as in low cost.

The optoelectronic oscillator and the wave-beam forming delay network may have the same or a different structure. For example, they may both be in a topological structure comprised of an optical switch, a circulator, a waveguide array grating, and a Faraday rotation mirror. They may both have a dispersive time delay structure comprised of optical fibers. Or one of them may be in a topological structure comprised of an optical switch, a circulator, a waveguide array grating, and a Faraday rotation mirror, while the other one be a fiber dispersive time delay network. Take the first case as an example, a true time delay line difference from a channel of the nth level waveguide array grating is incremented by $2^{n-1}\Delta t$, and by controlling the various levels of optical switches, a time delay from 0 to $2^{n-1}\Delta t$ is realized. In consideration of their different requirement for time delay precision and time delay quantity, a time delay unit similar to a 2×2 switch may be cascaded subsequent to the optical switch 25, with the final unit adopting the 1×2 optical switch 20 for output.

The present invention has the advantages of being ultra-broad bandwidth and having no aperture effect of an optically controlled phased array radar. Additionally, it may work in different microwave frequency bands and carry out quick frequency hopping. Also, the present invention provides a simple and compact structure with low cost.

We claim:

1. A wholly optically controlled phased array transmitter with integrated optoelectronic oscillators and optical time delay networks based on multi-wavelength optical sources and optical time delay networks, comprising:
   a multi-wavelength optical source,
   a first wavelength division multiplexer,
   a first optical splitter,
   a first electro-optic modulator,
   a second optical splitter,
   a first optical amplifier,
   a first optical time delay network,
   a photodetector,
   an electric amplifier,
   a DC-block,
   a second electro-optic modulator,
   a second optical amplifier,
   a second optical time delay network,
   an optical combiner,
   a second wavelength division multiplexer,
   an optical fibers,
   a photodetector array,
   a T/R component array,
   a microwave antenna array,
   a 1×2 optical switch,
   a 2×2 optical switch,
   a circulator,
   a third wavelength division multiplexer,
   a bundle of optical fibers with various precise lengths, and
   a Faraday rotation mirror,
   wherein the first wavelength division multiplexer, the first optical splitter, the first electro-optic modulator, the second optical splitter, the second electro-optic modulator, the second optical amplifier, the second optical time delay network, the optical combiner, the second wavelength division multiplexer, the optical fiber, the photodetector array, the T/R component array, and the microwave antenna array are successively arranged along the direction of laser output of the multi-wavelength optical source;
   a second output port of the second optical splitter is connected with an RF input port of the first electro-optic modulator via the first optical amplifier, the first optical time delay network, the photodetector, the electric amplifier, and the DC-block in order, and form a close loop as an optoelectronic oscillator to generate a microwave signal;
   a second output port of the first optical splitter is connected with a second input port of the optical combiner; and
   a second input port of the second electro-optic modulator is a microwave input port.

2. The wholly optically controlled phased array transmitter of claim 1, wherein the first optical time delay network or the second optical time delay network is connected in a manner that a light transmitted from the first optical amplifier or the second optical amplifier is inputted via the 1×2 optical switch, and after gating, enters the third wavelength division multiplexer en route of the circulator;
   the third wavelength division multiplexer then demultiplexes the optical signal of the light, and redistributes the light to various wavelengths;
   the light then passes through a bundle of precisely-cut fibers of various lengths and is finally reflected back by the Faraday rotation mirror; and
   the light then passes again through the fibers, the third wavelength division multiplexer, and the circulator to arrive at the next optical switch.

3. The wholly optically controlled phased array transmitter of claim 1, wherein the multi-wavelength optical source is a laser array or a multi-wavelength laser, that is a semi-conductor laser, an optical fiber laser, a gas laser, or a dye laser.

4. The wholly optically controlled phased array transmitter of claim 1, wherein the wavelength division multiplexer is a dense wavelength division multiplexer or an array waveguide grating multi/demultiplexer.

5. The wholly optically controlled phased array transmitter of claim 1, wherein the optical splitter/combiner is an optical coupler or an optical power splitter.

6. The wholly optically controlled phased array transmitter of claim 1, wherein the optical amplifier is an erbium-doped fiber amplifier, a semiconductor optical amplifier, or a Raman amplifier.

7. The wholly optically controlled phased array transmitter of claim 1, wherein the electro-optic modulator is an optical intensity modulator, a single sideband modulator, or an electro-absorption modulator;
   the modulator is a lithium niobate Mach-Zehnder modulator or a polymer structure modulator.

8. The wholly optically controlled phased array transmitter of claim 1, wherein the optical time delay network is a multi-wavelength based optical true time delay network, an optical-fiber-based dispersive time delay network, a fiber-Bragg-grating based dispersive time delay network, an optical space-based time delay network, a planar-waveguide-structure based time delay network, or a time delay network based on silicon based waveguide structure.

9. The wholly optically controlled phased array transmitter of claim 1, characterized wherein the photodetector is a PIN diode or an APD.

10. The wholly optically controlled phased array transmitter of claim 1, wherein the electric amplifier is a broadband amplifier, a low noise amplifier, or a driver amplifier for a modulator.

* * * * *